United States Patent
Brown, II

(10) Patent No.: US 11,464,364 B1
(45) Date of Patent: Oct. 11, 2022

(54) PROTECTIVE COVER FOR AN OUTDOOR GRILL

(71) Applicant: Earl Brown, II, Monks Corner, SC (US)

(72) Inventor: Earl Brown, II, Monks Corner, SC (US)

( * ) Notice: Subject to any disclaimer, the term of this patent is extended or adjusted under 35 U.S.C. 154(b) by 862 days.

(21) Appl. No.: 16/372,522

(22) Filed: Apr. 2, 2019

(51) Int. Cl.
A47J 37/07 (2006.01)

(52) U.S. Cl.
CPC ............................... *A47J 37/0786* (2013.01)

(58) Field of Classification Search
CPC .................................................. A47J 37/0786
See application file for complete search history.

(56) References Cited

U.S. PATENT DOCUMENTS

| | | | |
|---|---|---|---|
| 1,772,827 A * | 8/1930 | Caster-Udell | A01K 13/006 54/79.1 |
| 2,103,109 A * | 12/1937 | De Mar | A01K 13/006 54/79.1 |
| 4,167,175 A * | 9/1979 | Malafouris | A47J 37/0786 126/25 C |
| D466,752 S | 12/2002 | Rowe | |
| 6,506,471 B2 * | 1/2003 | Doppelt | A62C 8/06 428/102 |
| 6,517,141 B1 * | 2/2003 | Su | B60J 11/00 150/166 |
| 6,863,100 B2 * | 3/2005 | Neal | A47J 37/0786 D6/610 |
| D549,032 S | 8/2007 | Goudeau | |
| 7,866,358 B1 | 1/2011 | Simms | |
| 9,468,337 B2 | 10/2016 | Simon | |
| 9,596,958 B1 | 3/2017 | Murphy | |
| 2007/0283946 A1 | 12/2007 | Maruzzo | |
| 2008/0264351 A1 * | 10/2008 | Williams | A01K 13/006 119/850 |
| 2009/0101256 A1 | 4/2009 | Maruzzo | |
| 2015/0075684 A1 * | 3/2015 | Simon | A47J 37/0786 150/165 |
| 2016/0183727 A1 * | 6/2016 | Wangler | A47J 37/0786 150/165 |
| 2018/0008094 A1 * | 1/2018 | Mackinder | A47J 37/0786 |
| 2021/0353100 A1 * | 11/2021 | Driscoll | A47J 37/0786 |

FOREIGN PATENT DOCUMENTS

WO 03042060 5/2003

* cited by examiner

*Primary Examiner* — Jorge A Pereiro
*Assistant Examiner* — Logan P Jones

(57) ABSTRACT

The protective cover for an outdoor grill is configured for use with a grill that is further defined with a plurality of stanchions. The protective cover for an outdoor grill is a protective shell placed over the grill. The protective cover for an outdoor grill is configured such that the plurality of stanchions project beyond the space protected by the protective cover for an outdoor grill. The protective cover for an outdoor grill is an elastic structure such that the protective cover for an outdoor grill pulls against the grill when the grill is protected by the protective cover for an outdoor grill. The protective cover for an outdoor grill comprises a plurality of lateral panels, a superior panel, an inferior panel, and a plurality of seams. The plurality of seams assemble the plurality of lateral panels, the superior panel, and the inferior panel.

18 Claims, 7 Drawing Sheets

US 11,464,364 B1

PROTECTIVE COVER FOR AN OUTDOOR GRILL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including kitchen equipment for roasting, more specifically, an accessory for a roaster. (A47J37/0786)

SUMMARY OF INVENTION

The protective cover for an outdoor grill is configured for use with a grill. The grill is further defined with a plurality of stanchions. The plurality of stanchions raise the grill above the ground. The protective cover for an outdoor grill is a protective shell placed over the grill. The protective cover for an outdoor grill is configured such that the plurality of stanchions project beyond the space protected by the protective cover for an outdoor grill. The protective cover for an outdoor grill is an elastic structure such that the protective cover for an outdoor grill pulls against the grill when the grill is protected by the protective cover for an outdoor grill. The protective cover for an outdoor grill comprises a plurality of lateral panels, a superior panel, an inferior panel, and a plurality of seams. The plurality of seams assemble the plurality of lateral panels, the superior panel, and the inferior panel. The plurality of lateral panels, the superior panel, the inferior panel form the protective shell. The plurality of lateral panels, the superior panel, and the inferior panel are formed from a composite textile.

These together with additional objects, features and advantages of the protective cover for an outdoor grill will be readily apparent to those of ordinary skill in the art upon reading the following detailed description of the presently preferred, but nonetheless illustrative, embodiments when taken in conjunction with the accompanying drawings.

In this respect, before explaining the current embodiments of the protective cover for an outdoor grill in detail, it is to be understood that the protective cover for an outdoor grill is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the protective cover for an outdoor grill.

It is therefore important that the claims be regarded as including such equivalent construction insofar as they do not depart from the spirit and scope of the protective cover for an outdoor grill. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
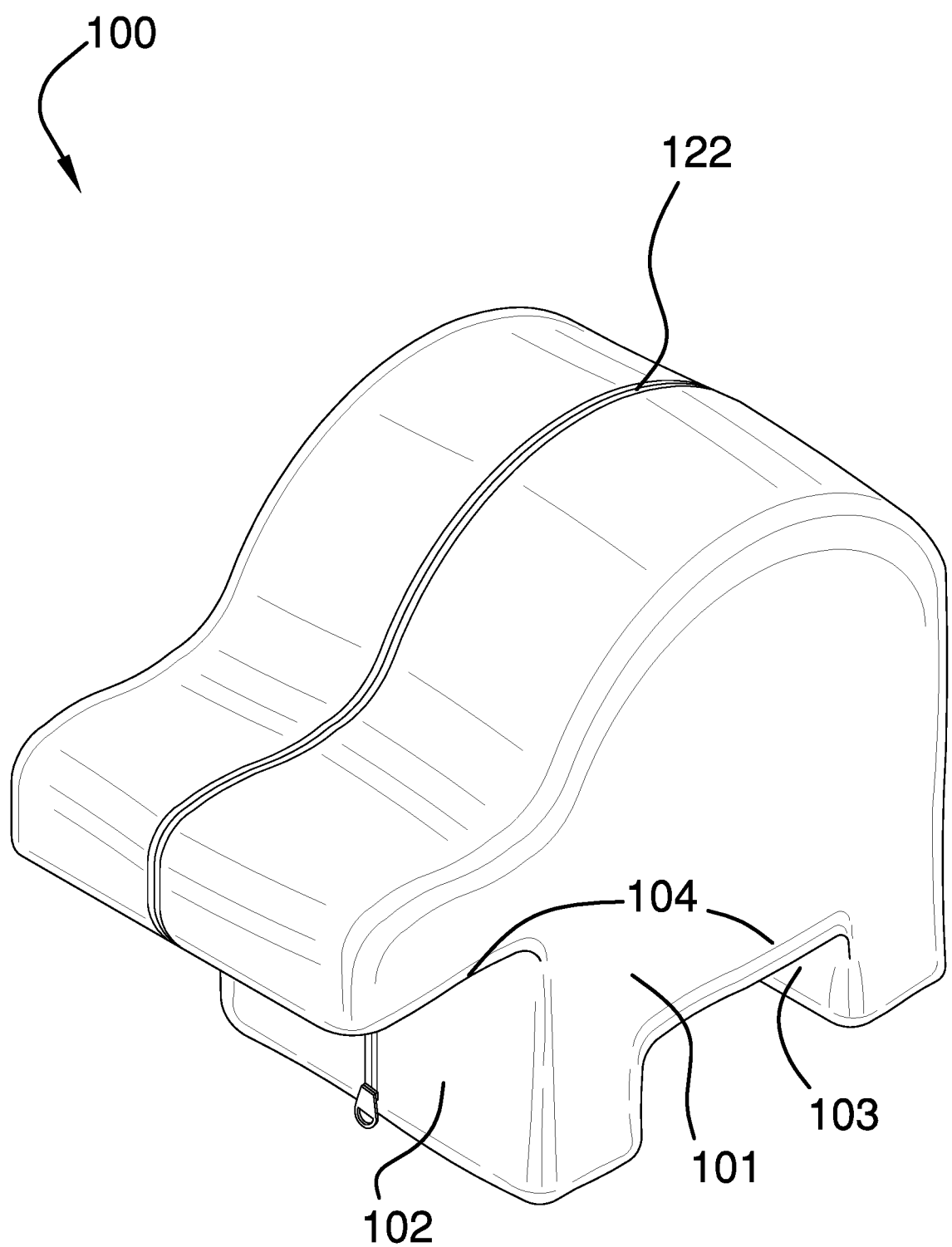
FIG. 1 is a perspective view of an embodiment of the disclosure.
Figure 2:
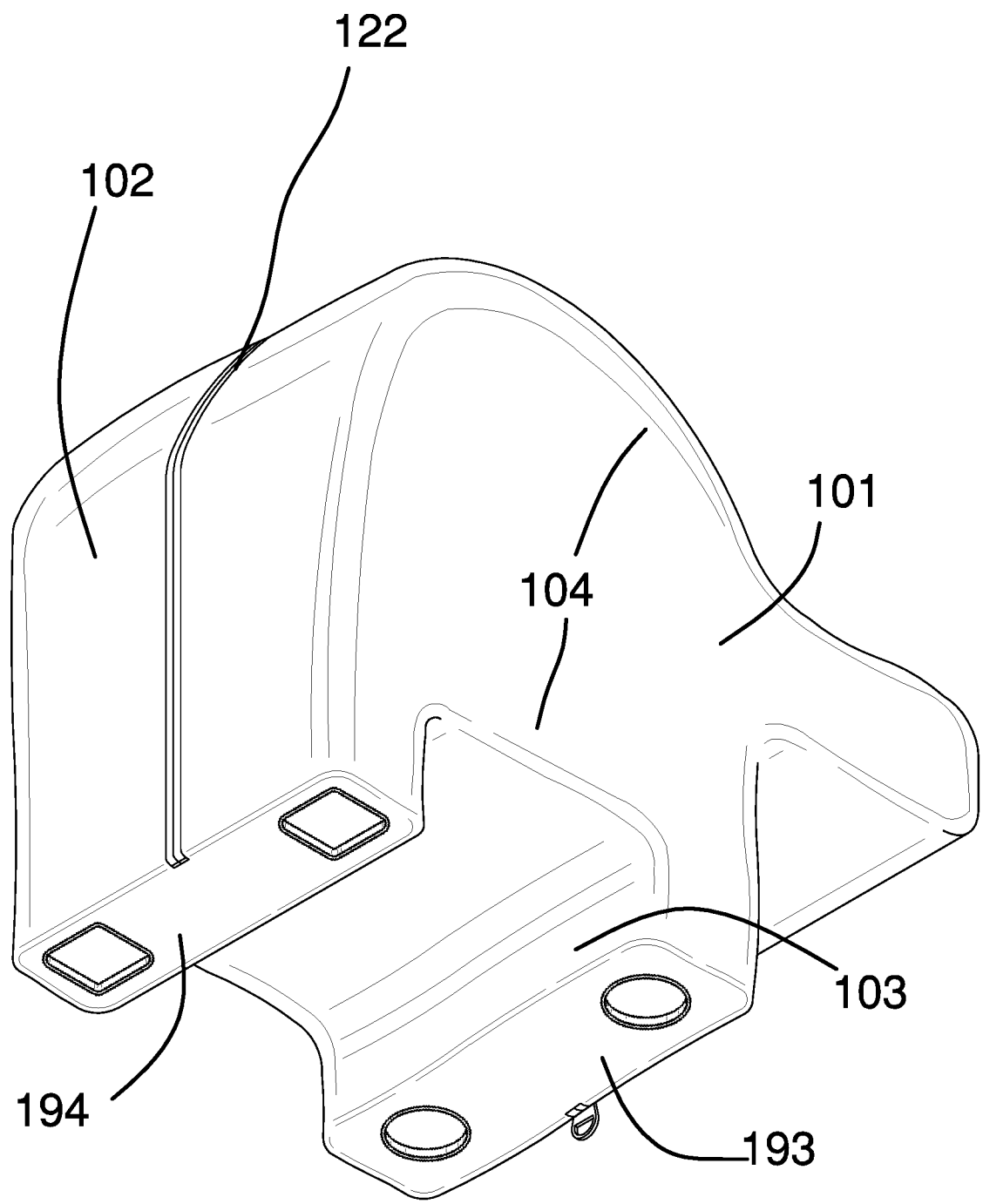
FIG. 2 is a reverse perspective view of an embodiment of the disclosure.
Figure 3:
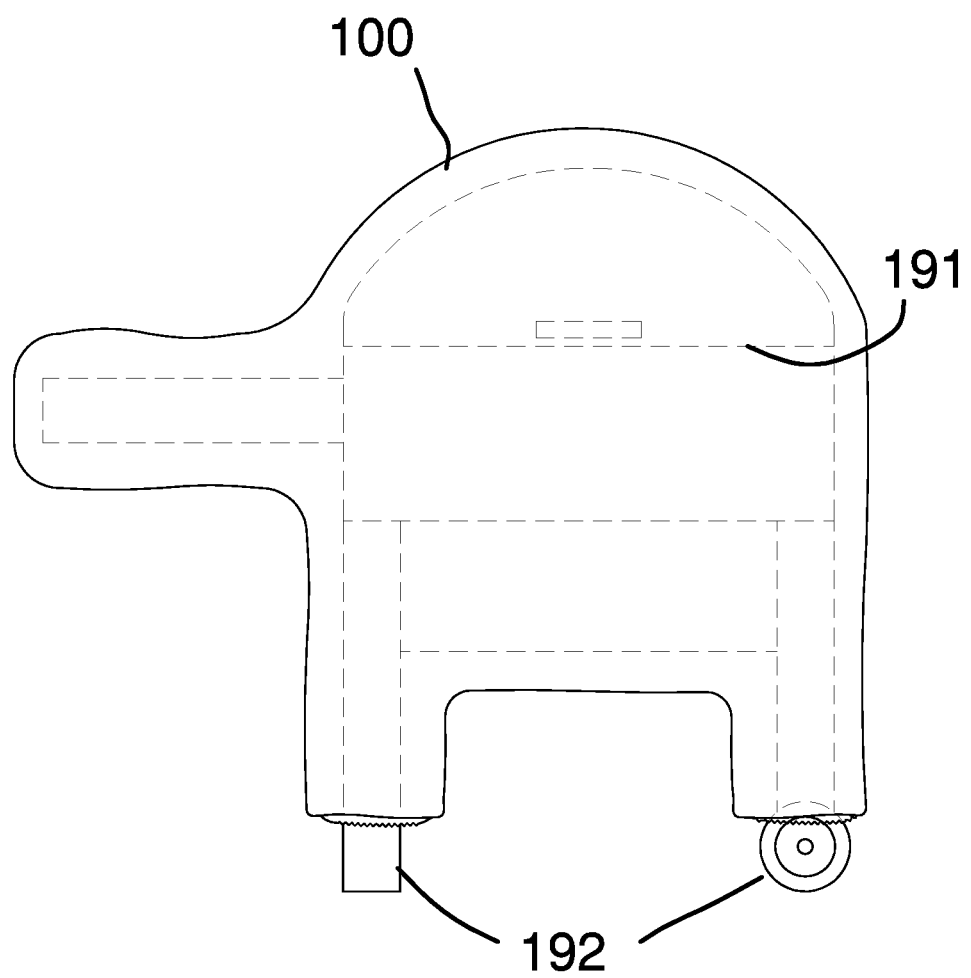
FIG. 3 is an in-use view of an embodiment of the disclosure.
Figure 4:
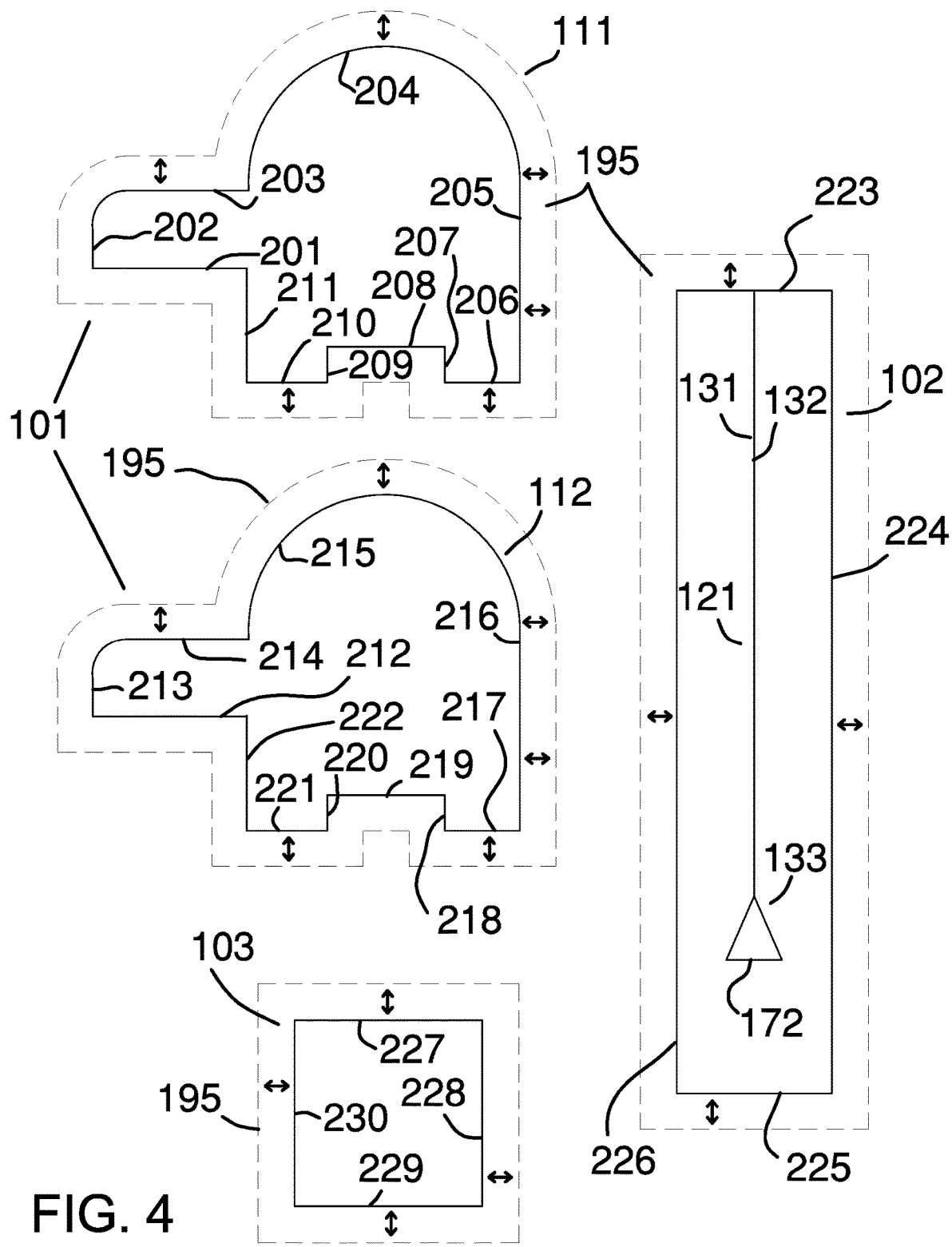
FIG. 4 is an exploded view of an embodiment of the disclosure.
Figure 5:
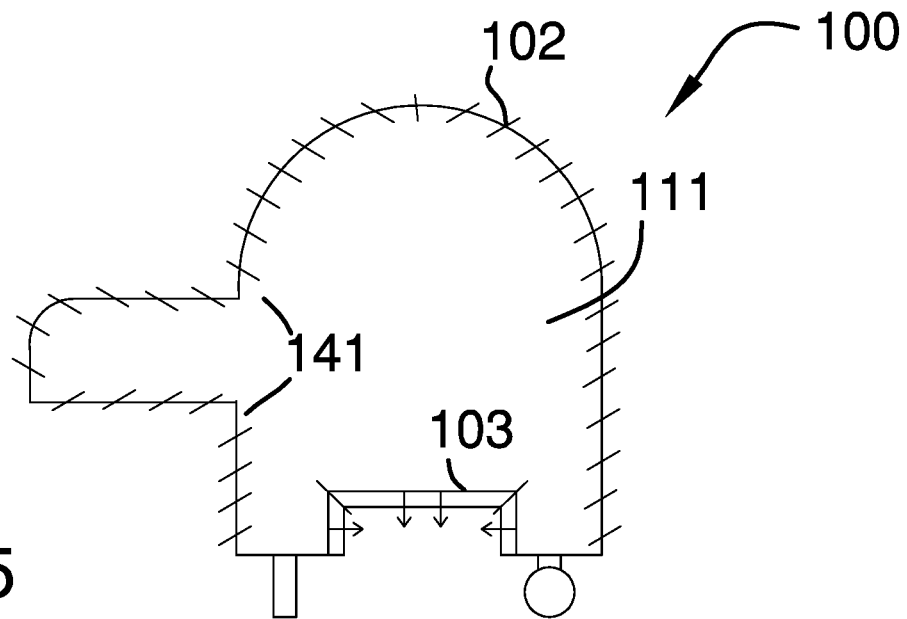
FIG. 5 is a side view of an embodiment of the disclosure.
Figure 6:
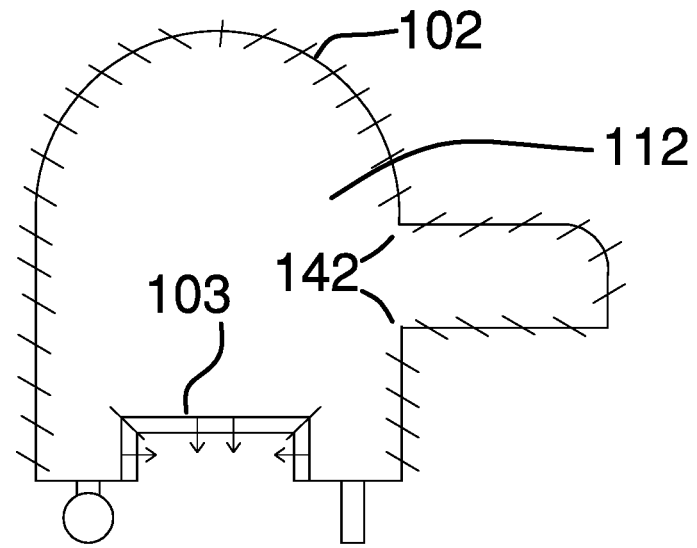
FIG. 6 is a reverse side view of an embodiment of the disclosure.
Figure 7:
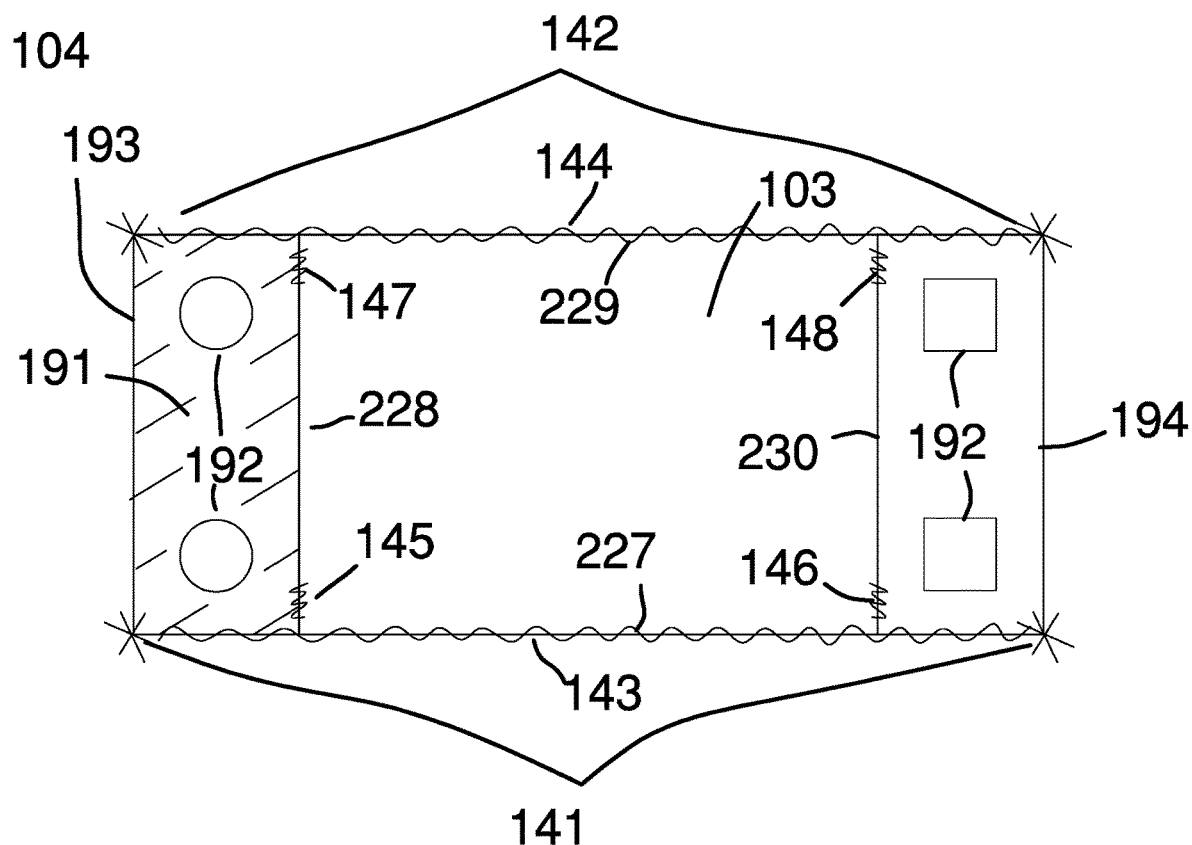
FIG. 7 is a bottom view of an embodiment of the disclosure.
Figure 8:
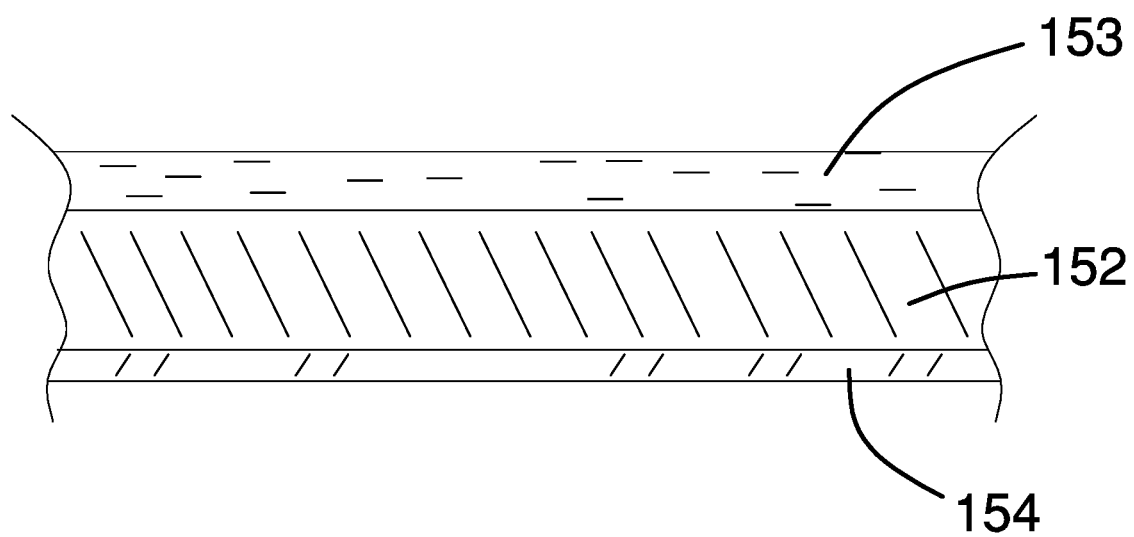
FIG. 8 is a detail view of an embodiment of the disclosure.

Detailed reference will now be made to one or more potential embodiments of the disclosure, which are illustrated in FIGS. 1 through 8.

The protective cover for an outdoor grill 100 (hereinafter invention) is configured for use with a grill 191. The grill 191 is further defined with a plurality of stanchions 192. The plurality of stanchions 192 raise the grill 191 above the ground. The invention 100 is a protective shell placed over the grill 191. The invention 100 is configured such that the plurality of stanchions 192 project beyond the space protected by the invention 100. The invention 100 is an elastic structure such that the invention 100 pulls against the grill 191 when the grill 191 is protected by the invention 100.

The invention 100 comprises a plurality of lateral panels 101, a superior panel 102, an inferior panel 103, and a plurality of seams 104. The plurality of seams 104 assemble the plurality of lateral panels 101, the superior panel 102, and the inferior panel 103. The plurality of lateral panels 101, the superior panel 102, the inferior panel 103 form the protective shell. The plurality of lateral panels 101, the superior panel 102, and the inferior panel 103 are formed from a composite textile 151. The invention 100 is further defined with a first stanchion aperture 193 and a second stanchion aperture 194.

The first stanchion aperture 193 is an aperture formed with the protective shell formed by the invention 100 that allows the plurality of stanchions 192 to extend beyond the invention 100. The second stanchion aperture 194 is an aperture formed with the protective shell formed by the invention 100 that allows the plurality of stanchions 192 to extend beyond the invention 100.

Each of the plurality of lateral panels 101 forms a vertical surface of the protective shell formed by the invention 100. Each of the plurality of lateral panels 101 is cut in an irregular shape. Each of the plurality of lateral panels 101 is identical. Each of the plurality of lateral panels 101 is an elastic structure.

The plurality of lateral panels 101 acts as springs. Specifically, when the grill 191 inserts into the invention 100, a radial force is applied to the plurality of lateral panels 101 in a direction away from the center of the invention 100. The applied radial force elongates the plurality of lateral panels 101 into an extended state 195. The elasticity of the plurality of lateral panels 101 creates a force that opposes the displacement created by the applied radial force. The elasticity of the plurality of lateral panels 101 returns the plurality of lateral panels 101 to its relaxed shape. The grill 191 will prevent the invention 100 from returning to its relaxed shape. In this circumstance, the plurality of lateral panels 101 will apply a force projecting radially towards the center of the invention 100 that binds the plurality of lateral panels 101 to the grill 191.

The extended state 195 is a term that refers to a structure selected from the group consisting of the plurality of lateral panels 101, the superior panel 102, and the inferior panel 103. The extended state 195 refers to a condition wherein the surface area of the selected object is greater than the surface area of the selected object in its relaxed shape.

The plurality of lateral panels 101 comprises a first lateral panel 111 and a second lateral panel 112. The first lateral panel 111 is formed from a composite textile 151. The second lateral panel 112 is formed from the composite textile 151. The composite textile 151 used in the second lateral panel 112 is identical to the composite textile 151 used in the first lateral panel 111.

The first lateral panel 111 forms a vertical surface of the protective shell formed by the invention 100. The first lateral panel 111 is cut from the composite textile 151 with an irregular shape. The first lateral panel 111 is an elastic structure. The second lateral panel 112 forms a vertical surface of the protective shell formed by the invention 100. The second lateral panel 112 is cut from the composite textile 151 with an irregular shape. The second lateral panel 112 is an elastic structure. The first lateral panel 111 and the second lateral panel 112 are geometrically identical. The first lateral panel 111 is diametrically opposed to the second lateral panel 112.

The first lateral panel 111 is further defined with a first edge 201, a second edge 202, a third edge 203, a fourth edge 204, a fifth edge 205, a sixth edge 206, a seventh edge 207, an eighth edge 208, a ninth edge 209, a tenth edge 210, and an eleventh edge 211.

The first edge 201 is a horizontal straight edge of the first lateral panel 111. The first edge 201 is perpendicular to the eleventh edge 211 and the second edge 202. The second edge 202 is a vertical straight edge of the first lateral panel 111. The first edge 201 is perpendicular to the first edge 201 and the third edge 203. Wherein the third edge 203 is a horizontal straight edge. The second edge 202 forms a rounded vertex with the third edge 203.

The fourth edge 204 form a semicircular edge of the first lateral panel 111. The fourth edge 204 forms a perpendicular edge with the third edge 203 and a straight edge with the fifth edge 205. The fifth edge 205 is a vertical straight edge of the first lateral panel 111. The fifth edge 205 is distal from the second edge 202 and the eleventh edge 211.

The sixth edge 206 is a horizontal straight edge of the first lateral panel 111. The sixth edge 206 is perpendicular to the fifth edge 205 and the seventh edge 207. The seventh edge 207 is a vertical straight edge of the first lateral panel 111. The seventh edge 207 is perpendicular to the sixth edge 206 and the eighth edge 208. The eighth edge 208 is a horizontal straight edge of the first lateral panel 111. The eighth edge 208 is perpendicular to the seventh edge 207 and the ninth edge 209. The ninth edge 209 is a vertical straight edge of the first lateral panel 111. The seventh edge 207 is perpendicular to the eighth edge 208 and the tenth edge 210. The tenth edge 210 is a horizontal straight edge of the first lateral panel 111. The tenth edge 210 is perpendicular to the ninth edge 209 and the eleventh edge 211. The eleventh edge 211 is a vertical straight edge of the first lateral panel 111.

The sixth edge 206, the eighth edge 208, and the tenth edge 210 are distal from the fourth edge 204.

The second lateral panel 112 is further defined with a twelfth edge 212, a thirteenth edge 213, a fourteenth edge 214, a fifteenth edge 215, a sixteenth edge 216, a seventeenth edge 217, an eighteenth edge 218, a nineteenth edge 219, a twentieth edge 220, a twenty-first edge 221, and a twenty-second edge 222.

The twelfth edge 212 is a horizontal straight edge of the second lateral panel 112. The twelfth edge 212 is perpendicular to the twenty-second edge 222 and the thirteenth edge 213. The thirteenth edge 213 is a vertical straight edge of the second lateral panel 112. The thirteenth edge 212 is perpendicular to the twelfth edge 212 and the fourteenth edge 214. The thirteenth edge 213 forms a rounded vertex with the fourteenth edge 214. The fourteenth edge 214 is a horizontal straight edge of the second lateral panel 112.

The fifteenth edge 215 form a semicircular edge of the second lateral panel 112. The fifteenth edge 215 forms a perpendicular edge with the fourteenth edge 214 and a straight edge with the sixteenth edge 216. The sixteenth edge 216 is a vertical straight edge of the second lateral panel 112. The sixteenth edge 216 is distal from the thirteenth edge 213 and the twenty-second edge 222.

The seventeenth edge 217 is a horizontal straight edge of the second lateral panel 112. The seventeenth edge 217 is perpendicular to the sixteenth edge 216 and the eighteenth edge 218. The eighteenth edge 218 is a vertical straight edge of the second lateral panel 112. The eighteenth edge 218 is perpendicular to the seventeenth edge 217 and the nineteenth edge 219. The nineteenth edge 219 is a horizontal straight edge of the second lateral panel 112. The nineteenth edge 219 is perpendicular to the eighteenth edge 218 and the twentieth edge 220. The twentieth edge 220 is a vertical straight edge of the second lateral panel 112. The eighteenth edge 218 is perpendicular to the nineteenth edge 219 and the twenty-first edge 221. The twenty-first edge 221 is a horizontal straight edge of the second lateral panel 112. The twenty-first edge 221 is perpendicular to the twentieth edge 220 and the twenty-second edge 222. The twenty-second edge 222 is a vertical straight edge of the second lateral panel 112.

The seventeenth edge 217, the nineteenth edge 219, and the twenty-first edge 221 are distal from the fifteenth edge 215.

The superior panel 102 forms the superior surface of the protective shell formed by the invention 100. The superior panel 102 is cut in a rectangular shape. The superior panel 102 is an elastic structure. The superior panel 102 is formed from the composite textile 151. The composite textile 151 used in the superior panel 102 is identical to the composite textile 151 used in the first lateral panel 111.

The superior panel 102 acts as a spring. Specifically, when the grill 191 inserts into the invention 100, a radial force is applied to the superior panel 102 in a direction away from the center of the invention 100. The applied radial force elongates the superior panel 102 into an extended state 195. The elasticity of the superior panel 102 creates a force that opposes the displacement created by the applied radial force. The elasticity of the superior panel 102 returns the superior panel 102 to its relaxed shape. The grill 191 will prevent the invention 100 from returning to its relaxed shape. In this circumstance, the superior panel 102 will apply a force projecting radially towards the center of the invention 100 that binds the superior panel 102 to the grill 191.

The superior panel 102 comprises a slit 121 and a zipper 122. The slit 121 is further defined with a first raw edge 131, a second raw edge 132, and a terminal point 133. The superior panel 102 is further defined with a twenty-third edge 223, a twenty-fourth edge 224, a twenty-fifth edge 225, and a twenty-sixth edge 226.

The slit 121 is a cut formed in the superior panel 102. The slit 121 is formed such that the slit 121 is oriented to each of the edges of the superior panel 102 to form a relationship selected from the group consisting of: a) a parallel relationship; or, b) a perpendicular relationship. The slit 121 allows the superior panel 102 to separate such that the grill 191 can be placed within the protective shell formed by the invention 100.

The first raw edge 131 is a raw edge formed by the cut that creates the slit 121. The first raw edge 131 forms an internal edge within the superior panel 102. The second raw edge 132 is a raw edge formed by the cut that creates the slit 121. The second raw edge 132 forms an internal edge within the superior panel 102. The terminal point 133 forms the interior end of the slit 121.

The zipper 122 is a fastening device. The zipper 122 attaches to the first raw edge 131 and the second raw edge 132. The zipper 122 opens and closes the first raw edge 131 and the second raw edge 132. The zipper 122 is a commercially available product. Those skilled in the textile art will recognize that a hook and loop fastener can replace the zipper 122 without undue experimentation.

The inferior panel 103 forms the inferior surface of the protective shell formed by the invention 100. The inferior panel 103 is cut in a rectangular shape. The inferior panel 103 is an elastic structure. The inferior panel 103 is formed from the composite textile 151. The composite textile 151 used in the inferior panel 103 is identical to the composite textile 151 used in the first lateral panel 111. The inferior panel 103 is further defined with a twenty-seventh edge 227, a twenty-eighth edge 228, a twenty-ninth edge 229, and a thirtieth edge 230.

The inferior panel 103 acts a spring. Specifically, when the grill 191 inserts into the invention 100, a radial force is applied to the inferior panel 103 in a direction away from the center of the invention 100. The applied radial force elongates the inferior panel 103 into an extended state 195. The elasticity of the inferior panel 103 creates a force that opposes the displacement created by the applied radial force. The elasticity of the inferior panel 103 returns the inferior panel 103 to its relaxed shape. The grill 191 will prevent the invention 100 from returning to its relaxed shape. In this circumstance, the inferior panel 103 will apply a force projecting radially towards the center of the invention 100 that binds the inferior panel 103 to the grill 191.

Each of the plurality of seams 104 is a sewn seam. Each of the plurality of seams 104 attaches a lateral panel selected from the plurality of lateral panels 101 to a panel selected from the group consisting of the superior panel 102 and the inferior panel 103. In the first potential embodiment of the disclosure, the each of the plurality of seams 104 is a sewn seam. The plurality of seams 104 comprises a first seam 141, a second seam 142, a third seam 143, a fourth seam 144, a fifth seam 145, a sixth seam 146, a seventh seam 147, and an eighth seam 148.

The first seam 141 is a seam selected from the plurality of seams 104 that attaches the first lateral panel 111 to the superior panel 102. The second seam 142 is a seam selected from the plurality of seams 104 that attaches the second lateral panel 112 to the superior panel 102.

The third seam 143 is a seam selected from the plurality of seams 104 that attaches the first lateral panel 111 to the inferior panel 103. The fourth seam 144 is a seam selected from the plurality of seams 104 that attaches the second lateral panel 112 to the inferior panel 103.

The fifth seam 145 is a seam selected from the plurality of seams 104 that attaches the first lateral panel 111 to the inferior panel 103. The sixth seam 146 is a seam selected from the plurality of seams 104 that attaches the first lateral panel 111 to the inferior panel 103. The seventh seam 147 is a seam selected from the plurality of seams 104 that attaches the second lateral panel 112 to the inferior panel 103. The eighth seam 148 is a seam selected from the plurality of seams 104 that attaches the second lateral panel 112 to the inferior panel 103.

The composite textile 151 comprises a collection of layers formed in the manner of a composite textile 151. The composite textile 151 is an elastic structure. The composite textile 151 forms the exterior surfaces of the protective shell formed by the invention 100. The composite textile 151 has a flexible sheeting structure. The composite textile 151 is cut into various shapes to form the structures of the plurality of lateral panels 101, the superior panel 102, and the inferior panel 103. The composite textile 151 forms a fluid impermeable structure that protects the grill 191 from the weather. The composite textile 151 comprises a base sheeting 152, a padded surface 153, and a coated surface 154.

The base sheeting 152 is the layer of the composite textile 151 that is sandwiched between the padded surface 153 and the coated surface 154. The base sheeting 152 is a sheeting that forms the bulk of the mass of the composite textile 151. The base sheeting 152 is formed from an elastic sheeting. In the first potential embodiment of the disclosure, the base sheeting 152 is formed from an elastic textile.

The padded surface 153 is a flocking structure formed from one or more layers of fiber that are applied to the surface of the base sheeting 152. The padded surface 153 forms a cushion. The padded surface 153 forms the interior surfaces of the protective shell formed by the invention 100. The padded surface 153 protects the grill 191 from damage. The use of flocking materials to form a cushioned surface is well-known and documented in the textile arts.

The coated surface 154 is the surface of the base sheeting 152 that is distal from the padded surface 153. The coated surface 154 forms the exterior surfaces of the protective shell formed by the invention 100. The coated surface 154 is coated with a layer of perfluorobutanesulfonic acid (CAS 375-73-5). The coated surface 154 forms a fluid impermeable barrier that protects the base sheeting 152, the padded surface 153, and the grill 191 from water damage. Methods to coat a sheeting with perfluorobutanesulfonic acid (CAS 375-73-5) to form a coated surface 154 are well-known and documented in the textile arts.

The following six paragraphs describe the assembly of the invention 100.

The first seam 141 attaches the twenty-fourth edge 224 of the superior panel 102 to the first edge 201 of the first lateral panel 111. The first seam 141 attaches the twenty-fourth edge 224 of the superior panel 102 to the second edge 202 of the first lateral panel 111. The first seam 141 attaches the twenty-fourth edge 224 of the superior panel 102 to the third edge 203 of the first lateral panel 111. The first seam 141 attaches the twenty-fourth edge 224 of the superior panel 102 to the fourth edge 204 of the first lateral panel 111. The first seam 141 attaches the twenty-fourth edge 224 of the superior panel 102 to the fifth edge 205 of the first lateral panel 111. The first seam 141 attaches the twenty-fourth edge 224 of the superior panel 102 to the eleventh edge 211 of the first lateral panel 111.

The second seam 142 attaches the twenty-sixth edge 226 of the superior panel 102 to the twelfth edge 212 of the second lateral panel 112. The second seam 142 attaches the twenty-sixth edge 226 of the superior panel 102 to the thirteenth edge 213 of the second lateral panel 112. The second seam 142 attaches the twenty-sixth edge 226 of the superior panel 102 to the fourteenth edge 214 of the second lateral panel 112. The second seam 142 attaches the twenty-sixth edge 226 of the superior panel 102 to the fifteenth edge 215 of the second lateral panel 112. The second seam 142 attaches the twenty-sixth edge 226 of the superior panel 102 to the sixteenth edge 216 of the second lateral panel 112. The second seam 142 attaches the twenty-sixth edge 226 of the superior panel 102 to the twenty-second edge 222 of the second lateral panel 112.

The third seam 143 attaches the twenty-seventh edge 227 of the inferior panel 103 to the seventh edge 207 of the first lateral panel 111. The third seam 143 attaches the twenty-seventh edge 227 of the inferior panel 103 to the eighth edge 208 of the first lateral panel 111. The third seam 143 attaches the twenty-seventh edge 227 of the inferior panel 103 to the ninth edge 209 of the first lateral panel 111. The fourth seam 144 attaches the twenty-ninth edge 229 of the inferior panel 103 to the eighteenth edge 218 of the second lateral panel 112. The fourth seam 144 attaches the twenty-ninth edge 229 of the inferior panel 103 to the nineteenth edge 219 of the second lateral panel 112. The fourth seam 144 attaches the twenty-ninth edge 229 of the inferior panel 103 to the twentieth edge 220 of the second lateral panel 112.

The fifth seam 145 attaches the face of the inferior panel 103 to the vertex formed by the eighth edge 208 and the ninth edge 209 of the first lateral panel 111. The sixth seam 146 attaches the face of the inferior panel 103 to the vertex formed by the seventh edge 207 and the eighth edge 208 of the first lateral panel 111. The seventh seam 147 attaches the face of the inferior panel 103 to the vertex formed by the eighteenth edge 218 and the nineteenth edge 219 of the second lateral panel 112. The eighth seam 148 attaches the face of the inferior panel 103 to the vertex formed by the twentieth edge 220 and the nineteenth edge 219 of the second lateral panel 112.

The first stanchion aperture 193 is bounded by the twenty-fifth edge 225 of the superior panel 102. The first stanchion aperture 193 is bounded by the first edge 201 of the first lateral panel 111. The first stanchion aperture 193 is bounded by the twenty-first edge 221 of the second lateral panel 112. The first stanchion aperture 193 is bounded by the twenty-eighth edge 228 of the inferior panel 103. The second stanchion aperture 194 is bounded by the twenty-third edge 223 of the superior panel 102. The second stanchion aperture 194 is bounded by the sixth edge 206 of the first lateral panel 111. The second stanchion aperture 194 is bounded by the seventeenth edge 217 of the second lateral panel 112. The second stanchion aperture 194 is bounded by the thirtieth edge 230 of the inferior panel 103.

The slit 121 is cut through the twenty-third edge 223 of the superior panel 102 such that: a) the slit 121 passes through the center of the superior panel 102; and, b) the center of the superior panel 102 is between the terminal point 133 and the twenty-third edge 223 of the superior panel 102. The zipper 122 installs in the superior panel 102 such that the zipper 122 joins the first raw edge 131 to the second raw edge 132 of the slit 121.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Composite Textile: As used in this disclosure, a composite textile is a multilayer fabric made of two or more joined layers of textile or sheeting materials.

Correspond: As used in this disclosure, the term correspond is used as a comparison between two or more objects wherein one or more properties shared by the two or more objects match, agree, or align within acceptable manufacturing tolerances.

Curve or Curvature: As used in this disclosure, a curve refers to a continuous line that is not a straight line or a continuous surface that is not a planar surface. By continuous is meant that the continuous line or surface changes smoothly over one or more independent variables. Alternately, continuous can be taken to mean that a single-valued derivative with respect to any independent variable exists for all points on the curved line or curved surface. A note on usage: within this disclosure, when a prism is said to be curved, what will be meant is that the center axis of the prism is curved. The discontinuities inherent in the ends of the prism will continue to exist in the lateral face of the curved prism.

Cushion: As used in this disclosure a cushion is a structure formed with a pad that is used to prevent injury or damage to a person or object.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Textile: As used in this disclosure, an elastic textile is a textile that contains elastic yarns as some of the yarns that make up the textile. An elastic textile is constructed such that the elastic textile will stretch when a force is applied and will return to its original shape when after the force is removed.

Elastic Yarn: As used in this disclosure, an elastic yarn is a yarn formed from elastomeric materials.

Diameter: As used in this disclosure, a diameter of an object is a straight line segment (or a radial line) that passes through the center (or center axis) of an object. The line segment of the diameter terminates at the perimeter or boundary of the object through which the line segment of the diameter runs.

Diametrically Opposed: As used in this disclosure, diametrically opposed is a term that describes the locations of a first object and a second object located at opposite ends of a diameter drawn through a third object. The term diametric opposition can also be used to describe this relationship.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners.

Flocking: As used in this disclosure, flocking refers to a textured surface on a substrate. Specifically, flocking refers to the adhering of a plurality of fibers to the surface of the substrate.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Ground: As used in this disclosure, the ground is a solid supporting surface formed by the Earth. The term level ground means that the supporting surface formed by the ground is roughly perpendicular to the force of gravity. Always use supporting surface.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface. Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Irregular Shape: As used in this disclosure, an irregular refers to an object with a form factor that comprises a combination of: a) straight lines or planes; and, b) curved lines or planes; that, c) has no clearly established or well-known geometric name. The object is selected from the group consisting of a two-dimensional object and a three-dimensional object.

Lateral: As used in this disclosure, the term lateral refers to a pair of vertical sides of an object that are diametrically opposed.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or as bean bag chair beans.

Perfluorobutanesulfonic acid: As used in this disclosure, perfluorobutanesulfonic acid (CAS 375-73-5) is a surfactant, technically a fluorosurfactant, which is commonly applied to a textile as a water repellant.

Radial: As used in this disclosure, the term radial refers to a direction that: 1) is perpendicular to an identified central axis; or, 2) projects away from a center point.

Raw Edge: As used in this disclosure, a raw edge refers to one of two edges formed when a sheeting is partially cut from the edge towards the center of the sheeting. The end of the partial slit is called the termination point.

Relaxed Shape: As used in this disclosure, a structure is considered to be in its relaxed state when no shear, strain, or torsional forces are being applied to the structure.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheeting: As used in this disclosure, a sheeting is a material, such as a paper, textile, a plastic, or a metal foil, in the form of a thin flexible layer or layers.

Slit: As used in this disclosure, a slit is a long narrow cut or opening formed in or through an object.

Stanchion: As used in this disclosure, a stanchion refers to a vertical pole, post, or support.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Textile: As used in this disclosure, a textile is a material that is woven, knitted, braided or felted. Synonyms in common usage for this definition include fabric and cloth.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Weather: As used in this disclosure, the term weather refers to a collection of measurable parameters of the atmosphere including, but not limited to, temperature, humidity, precipitation, air movement caused by wind and energy and illumination from the sun. A structure that isolates an individual or object from the more uncomfortable or destructive aspects of the weather is said to provide protection against the weather. The term elements is often used to refer to weather.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects.

Yarn: As used in this disclosure, a yarn is a continuous strand of textile fibers and filaments. Yarns are generally used in the production of fabrics. For the purposes of this disclosure, this definition explicitly includes yarns formed from a single filament such as a monofilament yarn.

Zipper: As used in this disclosure, a zipper is a fastening device comprising a first chain tape, a second chain tape, and a zipper pull. The first chain tape and the second chain tape are textile webbings formed with interlocking components that form a chain. The chain opened and closed by pulling a slide, called a zipper pull, over the first chain tape, a second chain tape. The individual elements of the chain are called the teeth of the chain.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An accessory comprising:
a plurality of lateral panels, a superior panel, an inferior panel, and a plurality of seams;
wherein the plurality of seams assemble the plurality of lateral panels, the superior panel, and the inferior panel;
wherein the plurality of lateral panels, the superior panel, and the inferior panel form a protective shell;
wherein the accessory is a protective shell;
wherein the accessory is configured for use with a grill;
wherein the accessory is placed over the grill;
wherein the grill is further defined with a plurality of stanchions;
wherein the plurality of stanchions project beyond the protective shell;
wherein the accessory is an elastic structure such that pulls against the grill;
wherein the each of the plurality of lateral panels, the superior panel, and the inferior panel are formed from a composite textile;
wherein the composite textile comprises a base sheeting, a padded surface, and a coated surface;
wherein the base sheeting is sandwiched between the padded surface and the coated surface;
wherein the base sheeting is formed from an elastic sheeting;
wherein the padded surface is a flocking structure formed from one or more layers of fiber;
wherein the padded surface is applied to the surface of the base sheeting;
wherein the padded surface forms the interior surfaces of the protective shell;
wherein the coated surface is the surface of the base sheeting that is distal from the padded surface;
wherein the coated surface forms the exterior surfaces of the protective shell formed by the accessory;
wherein the coated surface is coated with a layer of perfluorobutanesulfonic acid (CAS 375-73-5).

2. The accessory according to claim 1
wherein the composite textile used in the superior panel is identical to the composite textile used in the plurality of lateral panels;
wherein the composite textile used in the inferior panel is identical to the composite textile used in the plurality of lateral panels.

3. The accessory according to claim 2
wherein the accessory further comprises a first stanchion aperture and a second stanchion aperture;
wherein the first stanchion aperture is an aperture formed with the protective shell that allows one or more stanchions selected from the plurality of stanchions to extend beyond the accessory;
wherein the second stanchion aperture is an aperture formed with the protective shell that allows one or more stanchions selected from the plurality of stanchions to extend beyond the accessory.

4. The accessory according to claim 3
wherein each of the plurality of lateral panels forms a vertical surface of the protective shell;
wherein each of the plurality of lateral panels is identical;
wherein each of the plurality of lateral panels is an elastic structure;
wherein the grill applies a radial force the plurality of lateral panels in a direction away from the center of the accessory;
wherein the applied radial force elongates the plurality of lateral panels into an extended state;
wherein the grill prevents the plurality of lateral from returning to its relaxed shape;

wherein the extended state is a term that refers to a structure selected from the group consisting of the plurality of lateral panels, the superior panel, and the inferior panel;

wherein the extended state refers to a condition wherein the surface area of the selected object is greater than the surface area of the selected object in its relaxed shape.

5. The accessory according to claim 4 wherein the superior panel forms the superior surface of the protective shell formed by the accessory;

wherein the superior panel is cut in a rectangular shape;

wherein the superior panel is an elastic structure;

wherein the grill applies a radial force to the superior panel in a direction away from the center of the accessory;

wherein the applied radial force elongates the superior panel into an extended state;

wherein the grill prevents the accessory from returning to its relaxed shape.

6. The accessory according to claim 5 wherein the inferior panel forms the inferior surface of the protective shell formed by the accessory;

wherein the inferior panel is cut in a rectangular shape;

wherein the inferior panel is an elastic structure;

wherein the grill applies a radial force is applied to the inferior panel in a direction away from the center of the accessory;

wherein the applied radial force elongates the inferior panel into an extended state;

wherein the grill will prevent the accessory from returning to its relaxed shape;

wherein the inferior panel is further defined with a twenty-seventh edge, a twenty-eighth edge, a twenty-ninth edge, and a thirtieth edge.

7. The accessory according to claim 6 wherein each of the plurality of seams attaches a lateral panel selected from the plurality of lateral panels to a panel selected from the group consisting of the superior panel and the inferior panel.

8. The accessory according to claim 7 wherein the composite textile comprises a collection of layers formed in the manner of a composite textile;

wherein the composite textile is an elastic structure;

wherein the composite textile forms the exterior surfaces of the protective shell formed by the accessory;

wherein the composite textile has a flexible sheeting structure;

wherein the composite textile is cut into a plurality of shapes to form the structures of the plurality of lateral panels, the superior panel, and the inferior panel;

wherein the composite textile forms a fluid impermeable structure.

9. The accessory according to claim 8 wherein the plurality of lateral panels comprises a first lateral panel and a second lateral panel;

wherein the composite textile used in the second lateral panel is identical to the composite textile used in the first lateral panel;

wherein the first lateral panel forms a vertical surface of the protective shell formed by the accessory;

wherein the second lateral panel forms a vertical surface of the protective shell formed by the accessory;

wherein the first lateral panel is an elastic structure;

wherein the second lateral panel is an elastic structure.

10. The accessory according to claim 9 wherein the first lateral panel and the second lateral panel are geometrically identical;

wherein the first lateral panel is diametrically opposed to the second lateral panel.

11. The accessory according to claim 10 wherein the first lateral panel is further defined with a first edge, a second edge, a third edge, a fourth edge, a fifth edge, a sixth edge, a seventh edge, an eighth edge, a ninth edge, a tenth edge, and an eleventh edge;

wherein the second lateral panel is further defined with a twelfth edge, a thirteenth edge, a fourteenth edge, a fifteenth edge, a sixteenth edge, a seventeenth edge, an eighteenth edge, a nineteenth edge, a twentieth edge, a twenty-first edge, and a twenty-second edge;

wherein the first edge is a horizontal straight edge of the first lateral panel;

wherein the second edge is a vertical straight edge of the first lateral panel;

wherein the third edge is a horizontal straight edge of the first lateral panel;

wherein the fourth edge form a semicircular edge of the first lateral panel;

wherein the fifth edge is a vertical straight edge of the first lateral panel;

wherein the sixth edge is a horizontal straight edge of the first lateral panel;

wherein the seventh edge is a vertical straight edge of the first lateral panel;

wherein the eighth edge is a horizontal straight edge of the first lateral panel;

wherein the ninth edge is a vertical straight edge of the first lateral panel;

wherein the tenth edge is a horizontal straight edge of the first lateral panel;

wherein the eleventh edge is a vertical straight edge of the first lateral panel;

wherein the twelfth edge is a horizontal straight edge of the second lateral panel;

wherein the thirteenth edge is a vertical straight edge of the second lateral panel;

wherein the fourteenth edge is a horizontal straight edge of the second lateral panel;

wherein the fifteenth edge form a semicircular edge of the second lateral panel;

wherein the sixteenth edge is a vertical straight edge of the second lateral panel;

wherein the seventeenth edge is a horizontal straight edge of the second lateral panel;

wherein the eighteenth edge is a vertical straight edge of the second lateral panel;

wherein the nineteenth edge is a horizontal straight edge of the second lateral panel;

wherein the twentieth edge is a vertical straight edge of the second lateral panel;

wherein the twenty-first edge is a horizontal straight edge of the second lateral panel;

wherein the twenty-second edge is a vertical straight edge of the second lateral panel;

wherein the superior panel is further defined with a twenty-third edge, a twenty-fourth edge, a twenty-fifth edge, and a twenty-sixth edge.

12. The accessory according to claim 11 wherein the first edge is perpendicular to the eleventh edge and the second edge;

wherein the first edge is perpendicular to the first edge and the third edge;

wherein the second edge forms a rounded vertex with the third edge;

wherein the fourth edge forms a perpendicular edge with the third edge and a straight edge with the fifth edge;

wherein the sixth edge is perpendicular to the fifth edge and the seventh edge;

wherein the seventh edge is perpendicular to the sixth edge and the eighth edge;

wherein the eighth edge is perpendicular to the seventh edge and the ninth edge;

wherein the seventh edge is perpendicular to the eighth edge and the tenth edge;

wherein the tenth edge is perpendicular to the ninth edge and the eleventh edge;

wherein the twelfth edge is perpendicular to the twenty-second edge and the thirteenth edge;

wherein the thirteenth edge is perpendicular to the twelfth edge and the fourteenth edge;

wherein the thirteenth edge forms a rounded vertex with the fourteenth edge;

wherein the fifteenth edge forms a perpendicular edge with the fourteenth edge and a straight edge with the sixteenth edge;

wherein the seventeenth edge is perpendicular to the sixteenth edge and the eighteenth edge;

wherein the eighteenth edge is perpendicular to the seventeenth edge and the nineteenth edge;

wherein the nineteenth edge is perpendicular to the eighteenth edge and the twentieth edge;

wherein the eighteenth edge is perpendicular to the nineteenth edge and the twenty-first edge;

wherein the twenty-first edge is perpendicular to the twentieth edge and the twenty-second edge.

13. The accessory according to claim 12
wherein the fifth edge is distal from the second edge and the eleventh edge;

wherein the sixth edge, the eighth edge, and the tenth edge are distal from the fourth edge;

wherein the sixteenth edge is distal from the thirteenth edge and the twenty-second edge;

wherein the seventeenth edge, the nineteenth edge, and the twenty-first edge are distal from the fifteenth edge;

wherein the superior panel further comprises a slit and a zipper;

wherein the slit is a cut formed in the superior panel;

wherein the zipper is a fastening device attached to the slit.

14. The accessory according to claim 13
wherein the slit is formed such that the slit is oriented to each of the edges of the superior panel to form a relationship selected from the group consisting of: a) a parallel relationship; or, b) a perpendicular relationship;

wherein the slit is further defined with a first raw edge, a second raw edge, and a terminal point;

wherein the first raw edge forms an internal edge within the superior panel;

wherein the second raw edge forms an internal edge within the superior panel;

wherein the zipper attaches to the first raw edge and the second raw edge;

wherein the zipper opens and closes the first raw edge and the second raw edge.

15. The accessory according to claim 14
wherein each of the plurality of seams is a sewn seam;
wherein the plurality of seams comprises a first seam, a second seam, a third seam, a fourth seam, a fifth seam, a sixth seam, a seventh seam, and an eighth seam;

wherein the first seam is a seam selected from the plurality of seams that attaches the first lateral panel to the superior panel;

wherein the second seam is a seam selected from the plurality of seams that attaches the second lateral panel to the superior panel;

wherein the third seam is a seam selected from the plurality of seams that attaches the first lateral panel to the inferior panel;

wherein the fourth seam is a seam selected from the plurality of seams that attaches the second lateral panel to the inferior panel;

wherein the fifth seam is a seam selected from the plurality of seams that attaches the first lateral panel to the inferior panel;

wherein the sixth seam is a seam selected from the plurality of seams that attaches the first lateral panel to the inferior panel;

wherein the seventh seam is a seam selected from the plurality of seams that attaches the second lateral panel to the inferior panel;

wherein the eighth seam is a seam selected from the plurality of seams that attaches the second lateral panel to the inferior panel.

16. The accessory according to claim 15
wherein the first seam attaches the twenty-fourth edge of the superior panel to the first edge of the first lateral panel;

wherein the first seam attaches the twenty-fourth edge of the superior panel to the second edge of the first lateral panel;

wherein the first seam attaches the twenty-fourth edge of the superior panel to the third edge of the first lateral panel;

wherein the first seam attaches the twenty-fourth edge of the superior panel to the fourth edge of the first lateral panel;

wherein the first seam attaches the twenty-fourth edge of the superior panel to the fifth edge of the first lateral panel;

wherein the first seam attaches the twenty-fourth edge of the superior panel to the eleventh edge of the first lateral panel;

wherein the second seam attaches the twenty-sixth edge of the superior panel to the twelfth edge of the second lateral panel;

wherein the second seam attaches the twenty-sixth edge of the superior panel to the thirteenth edge of the second lateral panel;

wherein the second seam attaches the twenty-sixth edge of the superior panel to the fourteenth edge of the second lateral panel;

wherein the second seam attaches the twenty-sixth edge of the superior panel to the fifteenth edge of the second lateral panel;

wherein the second seam attaches the twenty-sixth edge of the superior panel to the sixteenth edge of the second lateral panel;

wherein the second seam attaches the twenty-sixth edge of the superior panel to the twenty-second edge of the second lateral panel;

wherein the third seam attaches the twenty-seventh edge of the inferior panel to the seventh edge of the first lateral panel;

wherein the third seam attaches the twenty-seventh edge of the inferior panel to the eighth edge of the first lateral panel;

wherein the third seam attaches the twenty-seventh edge of the inferior panel to the ninth edge of the first lateral panel;

wherein the fourth seam attaches the twenty-ninth edge of the inferior panel to the eighteenth edge of the second lateral panel;

wherein the fourth seam attaches the twenty-ninth edge of the inferior panel to the nineteenth edge of the second lateral panel;

wherein the fourth seam attaches the twenty-ninth edge of the inferior panel to the twentieth edge of the second lateral panel;

wherein the fifth seam attaches the face of the inferior panel to the vertex formed by the eighth edge and the ninth edge of the first lateral panel;

wherein the sixth seam attaches the face of the inferior panel to the vertex formed by the seventh edge and the eighth edge of the first lateral panel;

wherein the seventh seam attaches the face of the inferior panel to the vertex formed by the eighteenth edge and the nineteenth edge of the second lateral panel;

wherein the eighth seam attaches the face of the inferior panel to the vertex formed by the twentieth edge and the nineteenth edge of the second lateral panel.

17. The accessory according to claim 16 wherein the first stanchion aperture is bounded by the twenty-fifth edge of the superior panel;

wherein the first stanchion aperture is bounded by the first edge of the first lateral panel;

wherein the first stanchion aperture is bounded by the twenty-first edge of the second lateral panel;

wherein the first stanchion aperture is bounded by the twenty-eighth edge of the inferior panel;

wherein the second stanchion aperture is bounded by the twenty-third edge of the superior panel;

wherein the second stanchion aperture is bounded by the sixth edge of the first lateral panel;

wherein the second stanchion aperture is bounded by the seventeenth edge of the second lateral panel;

wherein the second stanchion aperture is bounded by the thirtieth edge of the inferior panel.

18. The accessory according to claim 17 wherein the slit is cut through the twenty-third edge of the superior panel such that the slit passes through the center of the superior panel;

wherein the slit is cut through the twenty-third edge of the superior panel such that the center of the superior panel is between the terminal point and the twenty-third edge of the superior panel.

\* \* \* \* \*